(12) United States Patent
Yamamoto

(10) Patent No.: US 11,099,468 B2
(45) Date of Patent: Aug. 24, 2021

(54) LIGHT SOURCE DEVICE AND PROJECTION DISPLAY APPARATUS

(71) Applicant: Panasonic Intellectual Property Management Co., Ltd., Osaka (JP)

(72) Inventor: Norikazu Yamamoto, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/552,526

(22) Filed: Aug. 27, 2019

(65) Prior Publication Data

US 2020/0073218 A1 Mar. 5, 2020

(30) Foreign Application Priority Data

Aug. 29, 2018 (JP) .............................. JP2018-160652

(51) Int. Cl.
*G03B 21/20* (2006.01)
*G02B 5/04* (2006.01)
*G02B 27/48* (2006.01)

(52) U.S. Cl.
CPC ........... *G03B 21/2033* (2013.01); *G02B 5/04* (2013.01); *G02B 27/48* (2013.01)

(58) Field of Classification Search
CPC ....... G03B 21/2033; G02B 5/04; G02B 27/48
USPC .......................................................... 353/31
See application file for complete search history.

(56) References Cited

U.S. PATENT DOCUMENTS

| 6,081,320 | A | 6/2000 | Tanitsu | |
|---|---|---|---|---|
| 9,354,503 | B2* | 5/2016 | Otani | G02B 26/101 |
| 2006/0171138 | A1* | 8/2006 | Muramatsu | G03F 7/70566 362/23.18 |
| 2006/0187654 | A1* | 8/2006 | Jungel-Schmid | F21S 10/007 362/147 |
| 2009/0016061 | A1* | 1/2009 | Chen | G03B 21/2033 362/284 |
| 2010/0007934 | A1 | 1/2010 | Tokui | |
| 2010/0265466 | A1* | 10/2010 | Lescure | G02B 27/102 353/20 |

(Continued)

FOREIGN PATENT DOCUMENTS

| JP | 10-153866 | 6/1998 |
|---|---|---|
| JP | 5609615 | 10/2014 |

(Continued)

*Primary Examiner* — Jerry L Brooks
(74) *Attorney, Agent, or Firm* — Wenderoth, Lind & Ponack, L.L.P.

(57) ABSTRACT

A light source device includes: a light source configured to emit laser light; an optical system having an optical axis for guiding the laser light; a first prism which is disposed between the light source and the optical system and includes a first incident surface on which the laser light is incident, and a first exit surface inclined with respect to the first incident surface; a second prism which is disposed between the first prism and the optical system and includes a second incident surface facing the first exit surface at an interval, and a second exit surface inclined with respect to the second incident surface; and a driver configured to rotate the first and second prisms around the optical axis in a state in which the first exit surface and the second incident surface are inclined with respect to the optical axis.

16 Claims, 10 Drawing Sheets

(56) References Cited

U.S. PATENT DOCUMENTS

2010/0315597 A1* 12/2010 Powell .................. G03B 21/208
                                                    353/20
2012/0013852 A1*  1/2012 Champion ........... G02B 27/145
                                                    353/31
2012/0155079 A1   6/2012 Miura
2013/0222875 A1*  8/2013 Chifu ................... H04N 9/3152
                                                    359/201.1

FOREIGN PATENT DOCUMENTS

| JP | 2017-169672 | 9/2017 |
| WO | 2005/010963 | 2/2005 |
| WO | 2008/088001 | 7/2008 |
| WO | 2012/046330 | 4/2012 |

* cited by examiner

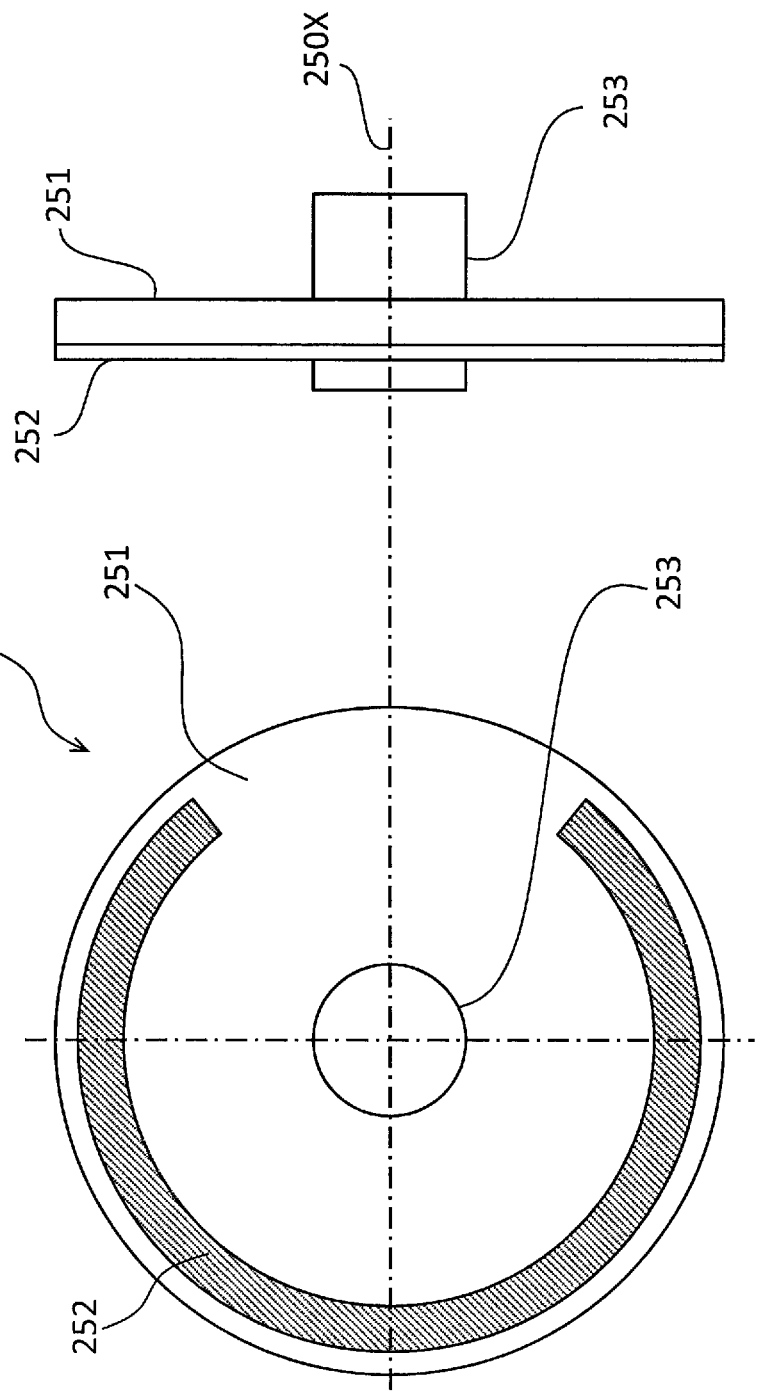

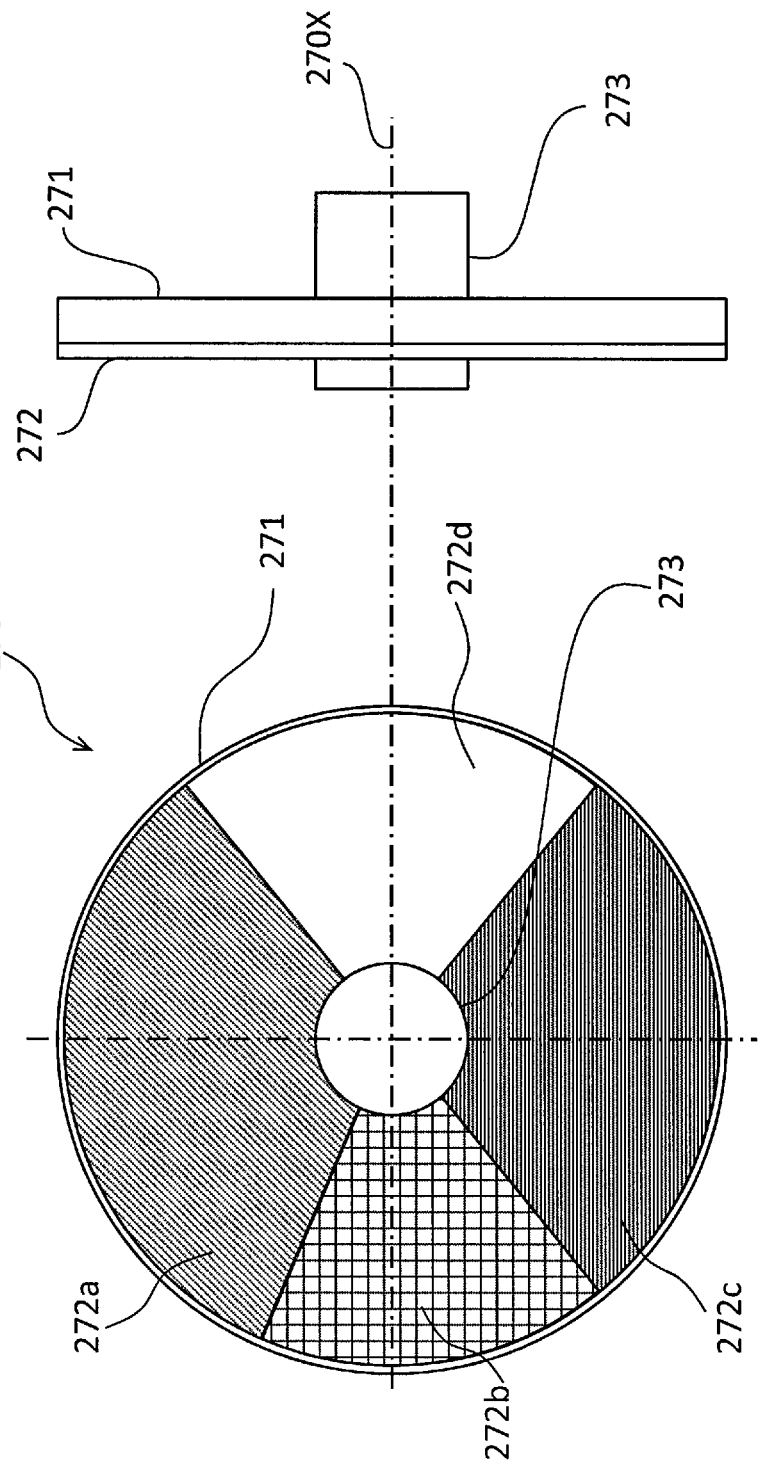

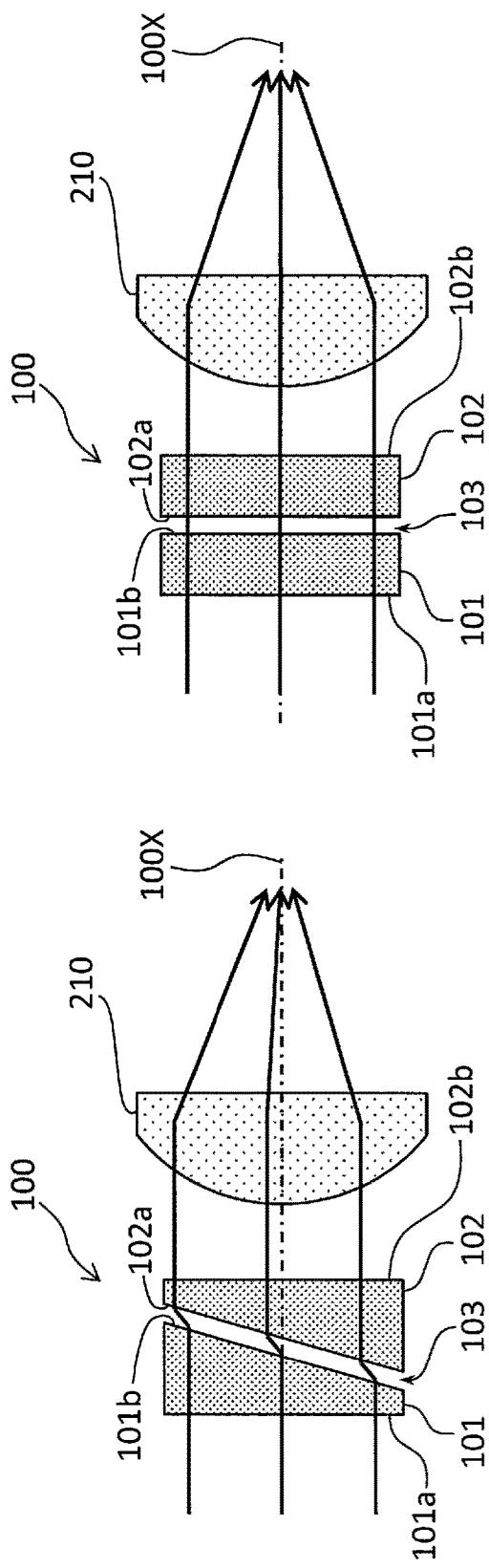
FIG. 6A
FIG. 6B
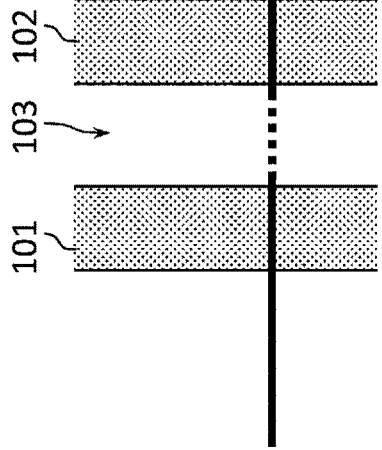
FIG. 6C
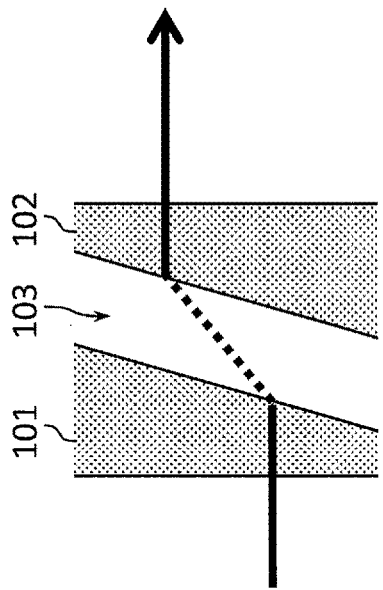
FIG. 6D

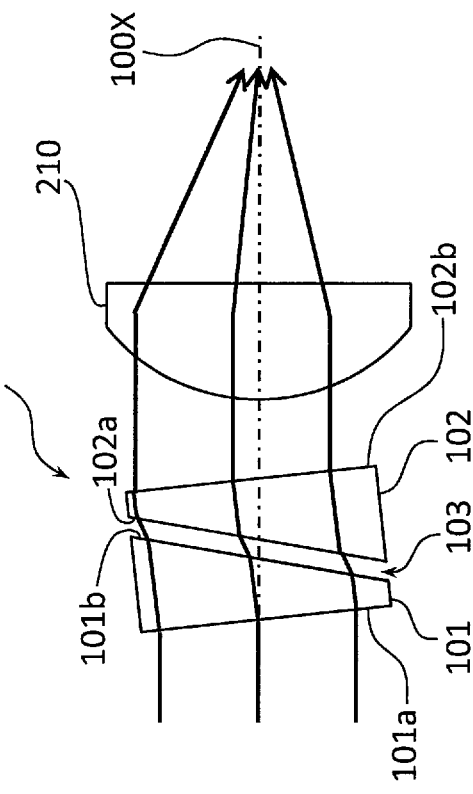
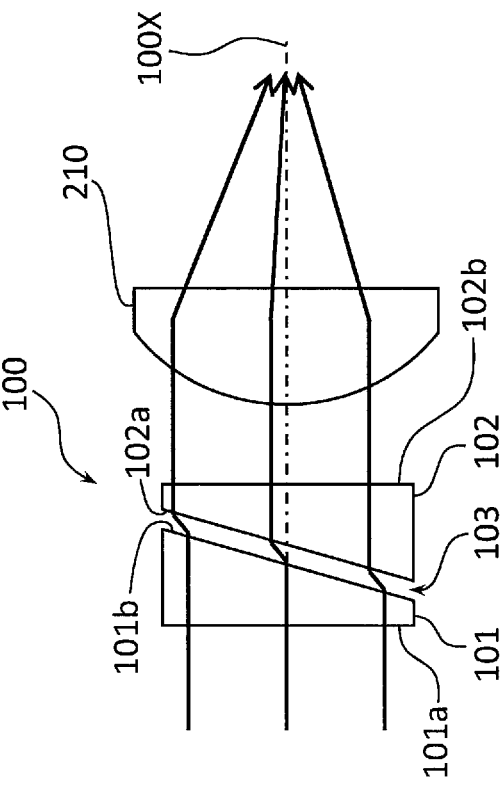

LIGHT SOURCE DEVICE AND PROJECTION DISPLAY APPARATUS

BACKGROUND

1. Technical Field

The present disclosure relates to a light source device and a projection display apparatus including the light source device.

2. Description of Related Art

In a light source device and a projection display apparatus using a laser light source, a technology for suppressing speckle noise generated due to the coherent property of the laser light source has been considered.

WO 2012/046330 A discloses a projection type display device aimed at enabling projection of an image with less speckle noise and a uniform luminance distribution. The projection-type display device of WO 2012/046330 A includes a pair of wedge prisms in front of a microlens array. Each of the pair of wedge prisms is disposed so that optical surfaces adjacent to each other are perpendicular to an optical axis of laser light, and the other outer optical surfaces are inclined with respect to the optical axis. WO 2012/046330 A attains reduction of speckle noise by changing an incident position of a light beam which is incident on the micro lens array by the wedge prisms disposed in this way.

JP 5609615 B2 discloses a laser light source device aimed at reducing speckle noise without lowering the brightness. In JP 5609615 B2, a right triangular prism is disposed in front of a rod-like integrator lens in a laser light source device, and the surface of the prism on the integrator lens side is inclined with respect to the optical axis. In JP 5609615 B2, speckle noise is reduced by vibrating the right triangular prism in parallel with the surface on the integrator lens side.

SUMMARY

The present disclosure provides a light source device and a projection display apparatus which can easily reduce speckle noise.

A light source device according to the present disclosure includes: a light source; an optical system; a first prism; a second prism; and a driver. The light source is configured to emit laser light. The optical system has an optical axis for guiding the laser light. The first prism is disposed between the light source and the optical system. The first prism includes a first incident surface on which the laser light is incident, and a first exit surface inclined with respect to the first incident surface. The second prism is disposed between the first prism and the optical system. The second prism includes a second incident surface facing the first exit surface at an interval, and a second exit surface inclined with respect to the second incident surface. The driver is configured to rotate the first and second prisms around the optical axis in a state in which the first exit surface and the second incident surface are inclined with respect to the optical axis.

A projection display apparatus according to the present disclosure includes: the light source device described above; and an image generator configured to generate image light based on light from the light source device.

According to the light source device and the projection display apparatus according to the present disclosure, speckle noise can be easily reduced.

BRIEF DESCRIPTION OF THE DRAWINGS

FIGS. 3A and 3B are views illustrating a configuration of a phosphor wheel of FIG. 1.

FIGS. 4A and 4B are views illustrating a configuration of a color separation wheel of FIG. 1.

FIGS. 6A to 6D are views illustrating a cross section of the rotating prism of FIGS. 5A and 5B.

FIGS. 7A and 7B are light beam diagrams for explaining the case when the rotating prism according to the first embodiment is inclined.

DETAILED DESCRIPTION

Figure 1:
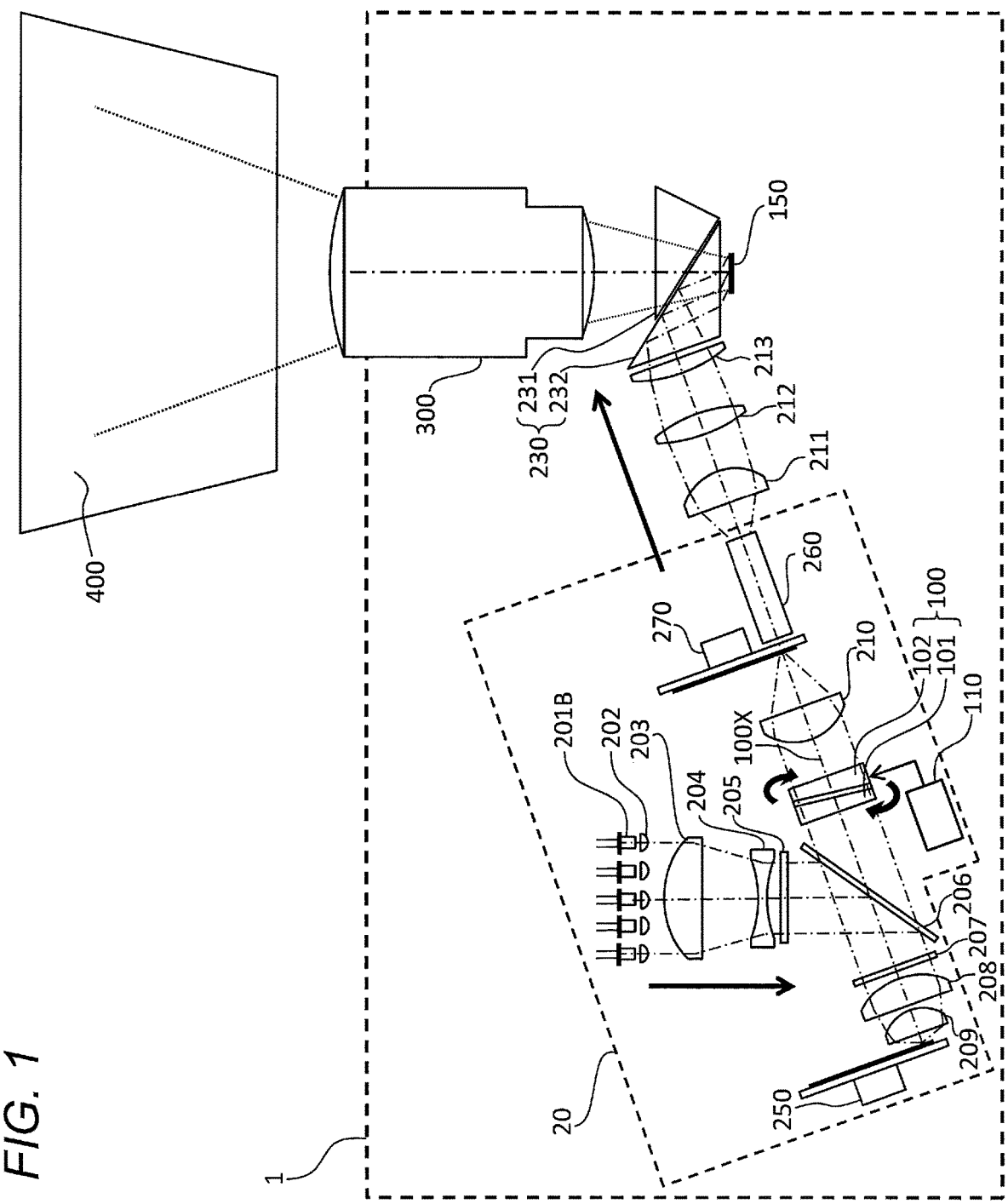
FIG. 1 is a diagram illustrating a configuration of a projection display apparatus according to a first embodiment.

Embodiments are described in detail below with reference to the drawings as appropriate. However, detailed description may be omitted if necessary. For example, detailed description of already well-known matters and redundant description of substantially the same configuration may be omitted. This is to avoid the following description from becoming unnecessary redundant and to facilitate understanding by those skilled in the art.

It should be noted that the attached drawings and the following description are provided to enable those skilled in the art to fully understand the present disclosure, and they are not intended to limit the claimed subject matter.

Circumstance to Reach the Present Disclosure

Before specific embodiments of the present disclosure are detailed, the circumstance to reach the present disclosure is described below.

Heretofore, a projection display apparatus has been widely used as a device for displaying a large screen image in a movie, a conference presentation, and the like. The projection display apparatus can display, for example, a distortion-free image that comes into focus even at the periphery by projecting projection light of image display on a substantially flat white projection surface.

As a light source of the projection display apparatus, there has been used a white light source with a large amount of light such as a xenon lamp or a super high pressure mercury lamp. However, it is essential to replace the lamp due to the lamp life at intervals of several thousand hours, and there has been a problem in the maintainability during long-term use that display is not enabled at all when the life of the lamp ends during use in the worst case.

Recently, there has been developed, in place of the white light source as described above, an optical unit and a projection display apparatus using a solid light source such as an LED or a laser having a long light source life. As a result, maintenance is improved because lamp replacement is unnecessary. In addition, because of the narrow spectral distribution characteristic of solid light sources, it has become possible to realize a projection display apparatus with a wide color gamut. In particular, by using a laser light source, it is possible to improve the light utilization efficiency because the spread of light from the light source is small. For the case of a device that requires particularly brightness, projection-type imaging devices using a blue or multiple color laser light source have been developed.

In a projection display apparatus using a laser light source, it is known that noise called speckle noise is caused due to the influence of light having a sufficiently high coherence (that is, coherent light), which is another characteristic of laser light. At this time, a spotted pattern of glittering light is observed in the vicinity of the projected image. Speckle noise is generated by interference with scattered light from different screen projection surfaces, since the scattered light striking the screen projection surface is also highly coherent light. At this time, since a spotted pattern appears in a portion different from the projection surface, there is a concern that not only the image quality is degraded but also discomfort may occur at the time of observation for a long time.

As an example of a device configuration aiming to reduce speckle noise, a configuration may be considered in which coherent light is converted into light whose phase is randomly distributed (that is, random light) in the device. For example, a configuration may be considered in which one or more diffusion plates are disposed in the optical path in the device and coherent light is made to approach random light by scattering laser light in the device in advance. By expanding the diffusion angle of the diffusion plates, the coherent light further approaches random light, but the light beam loss in the optical system also increases, and the light output of the projection display apparatus also decreases.

Further, as a technology aimed at reducing speckle noise while maintaining the light output, there is also considered, for example, a device configuration in which a prism is disposed on the front surface of an integrator optical system for uniforming light of illumination light and the prism is rotated or vibrated (see, for example, WO 2012/046330 A and JP 5609615 B2).

However, in the configuration of the technology described in WO 2012/046330 A, the irradiation position on the surface of the microlens array is moved by rotation or vibration of the prism to change the amount of light incident on a light modulation element. Thus, the amount of light incident on the light modulation element is reduced. In addition, in consideration of the above movement, it is necessary to increase the size of the microlens array. In addition, since the uniformity of light incident on the light modulation element changes according to the number of the microlens array, it is necessary to widen light beam flux incident on the microlens array in order to improve the light uniformity. As a result, a pair of wedge prisms also needs to be increased in size.

Furthermore, in order to incline the prism surfaces on the sides not facing each other in the pair of wedge prisms with respect to the optical axis and to change the irradiation position to the microlens array by rotation, it is necessary to shift the rotation central axis of the prisms from the position of the optical axis. For this reason, it is necessary to increase the size of the prism pair, and at the time of rotation or vibration, a driving device with large torque has been required.

Further, in the technology described in JP 5609615 B2, the light beam direction after the light beam exits from the prism changes according to the refractive index of the prism, and therefore, when light sources of a plurality of colors are used, the light beam direction changes for each color. Therefore, in order to condense light by a lens at a subsequent stage of the prism, it is necessary to increase the size of the lens at the subsequent stage. In addition, even when light is collected by the lens in the subsequent stage, the incident angle of an integrator lens fluctuates for each color, and a phenomenon occurs in which final light output of the device is different for each color. In addition, the optical axis is likely to fluctuate due to vibration displacement when the prism is vibrated, and in order to obtain stable light output, it is necessary to precisely control the vibration of the prism.

In view of the above, the present disclosure provides a light source device and a projection display apparatus using a laser light source, which are capable of reducing speckle noise without largely changing a configuration of an existing projection display apparatus. In addition, even when light sources of a plurality of colors are used, the incident angle for each color to a rod integrator does not change, and it is also possible to obtain stable light output even when rotation unevenness of the prism or the like occurs.

First Embodiment

A first embodiment is described below with reference to FIGS. 1 to 7. Hereinafter, as a specific embodiment of a projection display apparatus according to the present disclosure, a projection display apparatus in which light deflection control is performed by a digital micro mirror device (hereinafter referred to as "DMD") which is an example of an image generator is described.

1-1. Projection Display Apparatus

A projection display apparatus according to the first embodiment is described with reference to FIG. 1. FIG. 1 is a diagram illustrating a configuration of a projection display apparatus 1 according to this embodiment.

The projection display apparatus 1 illustrated in FIG. 1 includes a light source device 20 including blue semiconductor lasers (hereinafter also referred to as "LDs") 201B as an example of a laser light source. The light source device 20 of this embodiment includes various optical systems for guiding laser light from the plurality of LDs 201B, and a first prism 101 and a second prism 102 disposed on an optical path on which various optical systems form an optical axis 100X. The first prism 101 and the second prism 102 are, for example, wedge prisms, and each have a wedge shape in which one of the cross sections parallel to the optical axis 100X is inclined.

In this embodiment, the first prism 101 and the second prism 102 are coupled so as to face each other in opposite directions at an interval to constitute an integral rotating prism 100. The light source device 20 of this embodiment further includes a driver 110 including a motor for rotating the rotating prism 100 and the like. The driver 110 may include an actuator or the like, and may include various drive mechanisms and drive circuits for supporting the rotating prism 100 so as to be rotatable.

In the projection display apparatus 1 of this embodiment, when image light is projected onto a projection surface 400 using light from the light source device 20, the rotating prism 100 is rotationally driven in the light source device 20 so that speckle noise in the image light can be reduced.

In the projection display apparatus 1 illustrated in FIG. 1, the light source device 20 includes the plurality of LDs 201B, a plurality of lenses 202, 203, and 204, a diffusion plate 205, and a dichroic mirror 206. In this embodiment, the light source device 20 generates light of a plurality of colors using the LDs 201B that emit blue light.

The LDs 201B emit, for example, color light in the blue region with a wavelength range of 447 nm to 462 nm, which exits as linearly polarized light. The LDs 201B are arranged so that the exiting light becomes S-polarized light with respect to the incident surface of the dichroic mirror 206.

Each of the lenses 202 is a collimating lens that collimates light that exits from the LD 201B. The plurality of lenses 202 are provided, for example, corresponding to the plurality of LDs 201B, respectively. The lenses 203 and 204 constitute an afocal system which converges parallel light to generate parallel light. Specifically, one lens 203 is a condenser lens that condenses the parallel light from the plurality of lenses 202. The other lens 204 is a concave lens that collimates the light from the lens 203.

Figure 2:
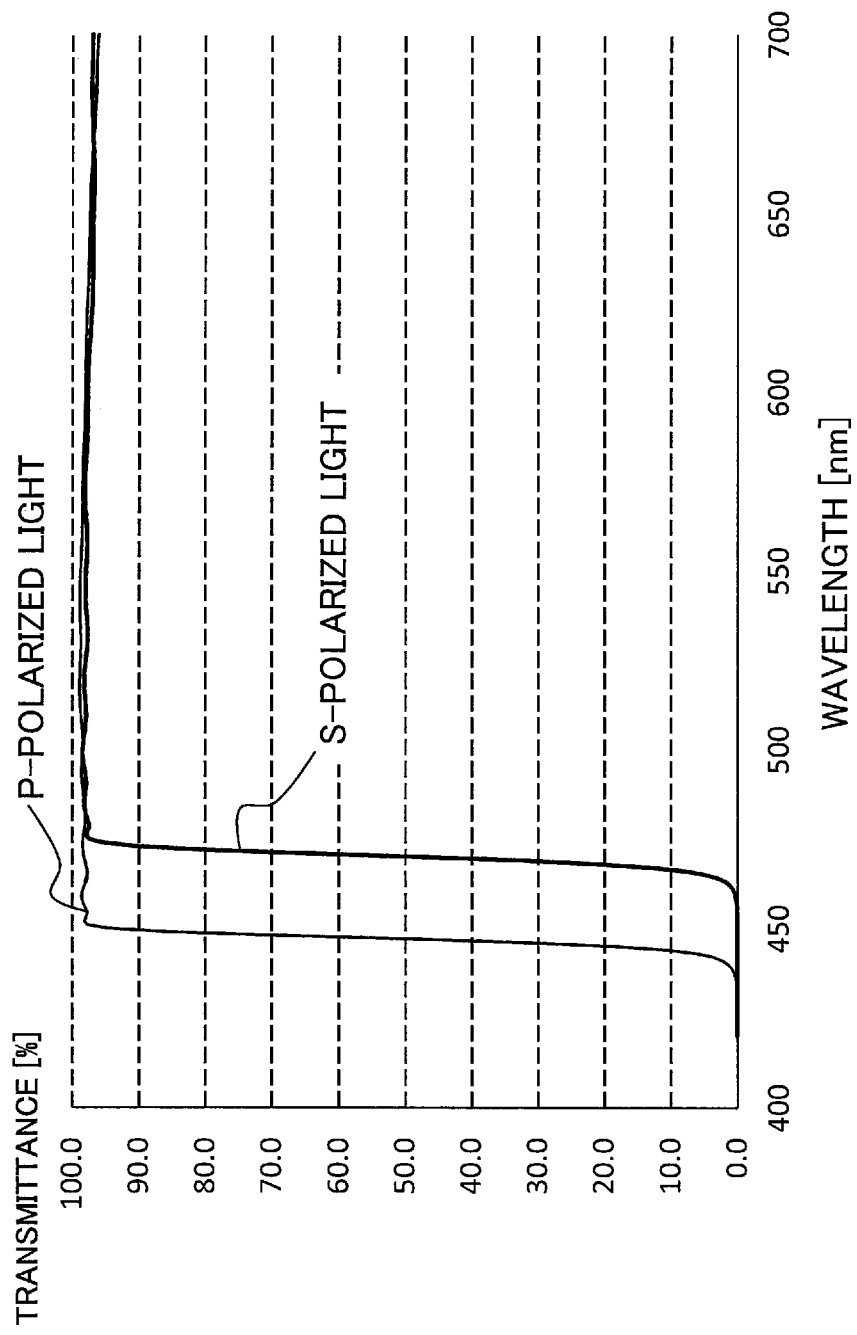
FIG. 2 is a graph showing spectral transmittance of a dichroic mirror of FIG. 1.

The diffusion plate 205 is a diffusion plate that diffuses the light from the lens 204. The light passed from the LDs 201B through the various lenses 202, 203, and 204 and the diffusion plate 205 is incident on the dichroic mirror 206. The dichroic mirror 206 has predetermined spectral transmittance characteristics. FIG. 2 shows spectral transmittance characteristics of the dichroic mirror 206.

FIG. 2 shows the characteristics of the dichroic mirror 206 in a case where light of incident light being S-polarized light is incident and in a case where light of P-polarized light is incident. In FIG. 2, the wavelengths at which the transmittance is 50% are 465 nm for S-polarized light and 442 nm for P-polarized light, both of which are included in the blue light. The dichroic mirror 206 transmits or reflects the blue light with the characteristics as described above. Further, according to the characteristics of FIG. 2, color light including green and red components is transmitted through the dichroic mirror 206 by 96% or more.

Returning to FIG. 1, the light source device 20 further includes a quarter-wave plate 207, condenser lenses 208 and 209, and a phosphor wheel 250. In the light source device 20, an S-polarized light component of the light (blue light) incident on the dichroic mirror 206 from the LDs 201B is reflected and travels in the direction of the quarter-wave plate 207.

The blue light reflected by the dichroic mirror 206 is incident on the quarter-wave plate 207. The quarter-wave plate 207 is a retardation plate in which a phase difference becomes a quarter-wavelength in the vicinity of the central wavelength of the light emission of the LDs 201B. The light transmitted through the quarter-wave plate 207 is converted to circularly polarized light and is incident on the condenser lenses 208 and 209.

Condenser lenses 208 and 209 condense incident light on the surface of phosphor wheel 250. The focal length of the condenser lens 209 is set so that the condensing angle is 40 degrees or less. With this, a focused spot of the blue light is formed in the vicinity of the phosphor wheel 250. At this time, since the light from the lens 204 is diffused by the diffusion plate 205, the intensity distribution of the focused spot of the blue light is substantially uniformed, so that the energy density of the phosphor surface can be prevented from being locally high.

The phosphor wheel 250 of this embodiment is an example of a wavelength conversion unit that generates yellow light (including green and red wavelength components) by fluorescence emission using the blue light as excitation light. A configuration of the phosphor wheel 250 is described with reference to FIGS. 3A and 3B. FIG. 3A is a front view of the phosphor wheel 250 as viewed from the light incident side. FIG. 3B is a side view of the phosphor wheel 250 as viewed from the side of FIG. 3A.

As illustrated in FIGS. 3A and 3B, the phosphor wheel 250 includes a circular aluminum substrate 251 and a drive motor 253 provided at the center of the substrate 251. In the phosphor wheel 250, the drive motor 253 can control rotation of the aluminum substrate 251 with respect to a central axis 250X.

A phosphor layer 252 is further formed on the surface (main surface on the light incident side) of the aluminum substrate 251, on which a reflective film (not shown) is formed. The reflective film is a metal layer or a dielectric film that reflects visible light. The phosphor layer 252 includes, for example, a Ce-activated YAG-based yellow phosphor that emits the yellow light when excited by the blue light. A typical chemical structure of the crystal matrix of the phosphor is $Y_3Al_5O_{12}$.

In the phosphor wheel 250 of this embodiment, as illustrated in FIG. 3A, the phosphor layer 252 is formed in a substantially annular shape excluding a part of the annular ring. Only the reflective film is formed on the part where the phosphor layer 252 is not present in order to reflect the blue light.

The phosphor layer 252 excited by spot light in the focused spot may generate heat upon fluorescence conversion to the yellow light. In the phosphor wheel 250, through rotation using the aluminum substrate 251 around the central axis 250X, temperature rise of the phosphor layer 252 due to the excitation light is suppressed. Thereby, the fluorescence conversion efficiency can be stably maintained.

The spot light incident on the phosphor layer 252 during the rotation of the phosphor wheel 250 is emitted as color light of green region and red region components when subjected to fluorescence conversion. At this time, the light emitted to the reflective film side is reflected by the reflective film. Therefore, the light after the fluorescence conversion exits from the phosphor wheel 250 to the incident side of the spot light. In addition, according to the fluorescence conversion, the color light of the green region and the red region components after the conversion becomes natural light whose polarization state is random.

On the other hand, when the spot light is incident on the portion only with the reflective film of the phosphor wheel 250 where the phosphor layer 252 is absent, the spot light is not subjected to fluorescence conversion and is reflected as the blue region component as it is to exit from the phosphor wheel 250. According to the reflection in the reflective film, the exiting light of the blue region component is reversed in the phase of the circularly polarized light from the time of incidence and becomes circularly polarized light in the opposite direction.

Returning to FIG. 1, the light exited from the phosphor wheel 250 is collimated into substantially parallel light by the condenser lenses 209 and 208, and is incident on the quarter-wave plate 207. Each of the lenses 209 and 208 is an example of an incident optical system in this embodiment. In the incident light to the quarter-wave plate 207, the color light of the green region and red region components, as natural light, passes through the quarter-wave plate 207 while the polarization state is random, and then is transmitted through the dichroic mirror 206. Further, the color light of the blue region component passes through the dichroic mirror 206 by being converted from circularly polarized light in the opposite direction to P-polarized light in the quarter-wave plate 207.

As described above, the color light in the green region and the red region obtained by the fluorescence conversion and the color light in the blue region efficiently polarization-converted by the quarter-wave plate 207 and the reflective film is caused to exit from the dichroic mirror 206 to the rotating prism 100 side. The color light can be made to be recognized as white light by performing color synthesis in a time division manner. The light passed from the phosphor wheel 250 through the above optical systems 209 to 206 is incident on the rotating prism 100 as collimated light flux within the range of tolerance as appropriate. Details of the rotating prism 100 are described later.

The light source device 20 of this embodiment further includes a condenser lens 210, a color separation wheel 270, and a rod integrator 260. The condenser lens 210 has an optical axis 100X for condensing the light exited from the rotating prism 100, and causes the condensed light to be incident on the rod integrator 260 via the color separation wheel 270. The condenser lens 210 is an example of a condensing optical system in this embodiment.

The color separation wheel 270 color-separates incident light to generate red light, the green light, the blue light, and the yellow light in a time division manner. A configuration of the color separation wheel 270 is described with reference to FIGS. 4A and 4B. FIG. 4A is a front view of the color separation wheel 270 as viewed from the light incident side. FIG. 4B is a side view of the color separation wheel 270 as viewed from the side of FIG. 4A.

As illustrated in FIGS. 4A and 4B, the color separation wheel 270 includes a circular transparent substrate 271 and a drive motor 273 provided at the center of the transparent substrate 271. In the color separation wheel 270, the drive motor 273 can control rotation of the transparent substrate 271 with respect to a central axis 270X.

The transparent substrate 271 is formed of, for example, a glass plate having a transmittance of a predetermined value or more over the entire visible range. A dichroic film 272 is formed on the surface (main surface on the light incident side) of the transparent substrate 271 so as to transmit only a desired wavelength band.

The dichroic film 272 is separated into four segments 272a to 272d, as illustrated in FIG. 4A, for example. For example, the segment 272a is formed by a dichroic film that transmits only color light in the yellow region (green region+red region). The segment 272b is formed by a dichroic film that transmits only color light in the red region. The segment 272c is formed by a dichroic film that transmits only color light in the green region. The segment 272d is formed by a dichroic film that transmits color light in the blue region or color light in the entire visible range. The size of each of the segments 272a to 272d is appropriately set from the viewpoint of equalizing the light amount of each color light obtained in the rotation cycle of the color separation wheel 270.

In the projection display apparatus 1, the phosphor wheel 250 and the color separation wheel 270 rotate in synchronization with each other. At this time, for example, the rotational position of the phosphor layer 252 of FIG. 3A and the rotational positions of the dichroic films 272a to 272c of FIG. 4A are controlled so as to be synchronized temporally.

According to the above control, the color light of the yellow region component (including the green region and red region components) exited from the phosphor layer 252 of FIGS. 3A and 3B is split into color light of yellow region, red region, and green region components, respectively, when being transmitted through the segments 272a, 272b, and 272c of the dichroic film 272 of FIGS. 4A and 4B to exit to the rod integrator 260 of FIG. 1. The light from the LDs 201B reflected by the portion of the reflective film without the phosphor layer 252 on the aluminum substrate 251 of FIGS. 3A and 3B is transmitted through the segment 272d of the dichroic film 272 of FIGS. 4A and 4B as the color light in the blue region, and the color light in the blue region exits to the rod integrator 260.

As described above, in the light source device according to this embodiment, the color light in the yellow region and the blue region exited from the phosphor wheel 250 are split into the color light in the red region, the green region, the blue region, and the yellow region in the color separation wheel 270, to exit to the rod integrator 260. Such color light in the red region, the green region, and the blue region is set, for example, to exhibit good three primary colors. According to color light of three primary colors, light emission characteristics with a good white balance can be obtained by performing color synthesis in a time division manner. In addition to this, by performing ON/OFF control in a DMD 150, conversion to color of a desired chromaticity coordinate is enabled. Moreover, the color light in the yellow region can be used, for example, to synthesize white light for securing the luminance of an image.

Referring back to FIG. 1 again, the rod integrator 260 is, for example, a solid rod and is made of a transparent member such as glass. The rod integrator 260 internally reflects the incident light a plurality of times to generate light having a uniform light intensity distribution. The rod integrator 260 may be a hollow rod having a mirror surface on the inner wall. The rod integrator 260 is an example of an integrator optical system in this embodiment.

In the light source device 20 of this embodiment, the color light in the blue region passed through the rotating prism 100 is output as light beams that differ in optical path length temporally. Furthermore, in the rod integrator 260, the number of reflections and the optical path length of the output light beam differ depending on the light beam incident angle to the rod integrator 260, and as a result, a light beam components that differ in phase even at the same time is added to the color light in the blue region.

The projection display apparatus 1 of this embodiment further includes lenses 211, 212, and 213, an internal total reflection prism (hereinafter, referred to as "TIR prism") 230, the DMD 150, and a projection optical system 300. The projection display apparatus 1 may include various control units (not shown) such as a microcomputer or a CPU that controls the DMD 150 based on an external video signal.

The lenses 211, 212, and 213 are relay lenses that substantially form an image of light that exits from the rod integrator 260 on the DMD 150. The light exited from the rod integrator 260 is transmitted through the lenses 211, 212, and 213 and is incident on the TIR prism 230. The TIR prism 230 includes two prisms 231 and 232. A thin air layer is formed on the near plane between the two prisms 231 and 232. The air layer between the prisms 231 and 232 totally reflects light incident at an angle equal to or larger than the critical angle. The light incident on the TIR prism 232 from the lens 213 is totally reflected by the above-described air layer and substantially forms an image on the DMD 150.

The projection display apparatus 1 of this embodiment modulates the DMD 150 based on various control signals such as video signals, and generates image light having different light intensities in a time division manner. Specifically, the DMD 150 has a plurality of movable micro mirrors. Each micro mirror basically corresponds to one pixel. The DMD 150 switches whether or not to direct reflected light to the projection optical system 300 for each micro mirror by changing the angle of each micro mirror based on a modulation signal. The light reflected by the DMD 150 is transmitted through both TIR prisms 232 and 231. Light projected as an image from the DMD 150 (that is, DMD-ON light) is incident on the projection optical system 300 and then exit to the projection surface 400.

Due to time division in the DMD-ON light, an image projected with the color light in the red region, the green region, the blue region, and the yellow region having various light intensities reaches the projection surface 400 and is recognized as a full color image. In this case, when the cycle of time division is long, it is assumed that the case where color flicker is perceived to human eyes. On the other hand, when the image information is 60 frames per second (60 fps), for example, the color flicker can be suppressed by driving one cycle from the red region to the yellow region at triple speed (180 fps) of the image information.

The laser light in the blue region exited to the projection surface 400 contains many components having different phases due to the rotating prism 100 and the rod integrator 260. Therefore, in the light beams in the blue region scattered from the projection surface 400, the components that generate speckle noise due to interference are reduced, and thus speckle noise can be effectively suppressed. In addition, since the light beam passed through the rotating prism 100 does not change in light beam angle regardless of the color light, it is possible to condense the light without light loss by the condenser lens 210. Therefore, it is possible to reduce the light beam loss in the optical system, and as a result, it is possible to suppress the decrease in the light output of the projection display apparatus 1.

1-2. Rotating Prism of Light Source Device

Details of the rotating prism 100 in the projection display apparatus 1 of this embodiment are described with reference to FIGS. 5A to 7B.

Figure 5A:
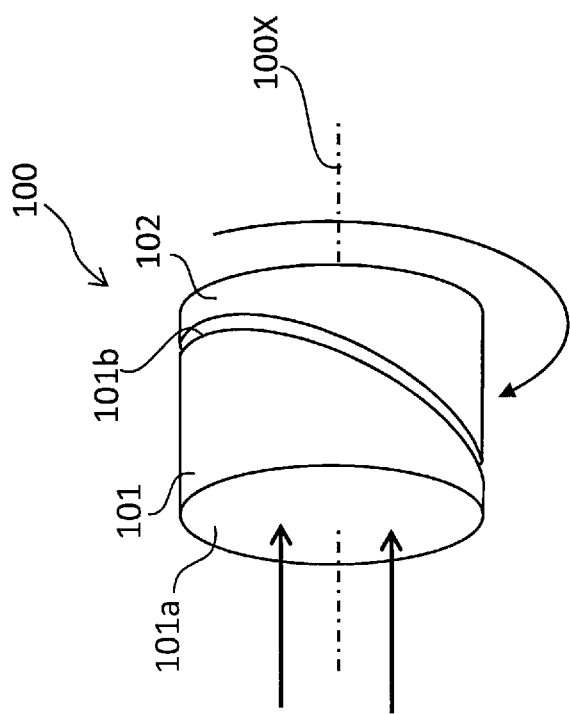
FIGS. 5A and 5B are views for explaining a configuration example of a rotating prism of FIG. 1.
Figure 5B:
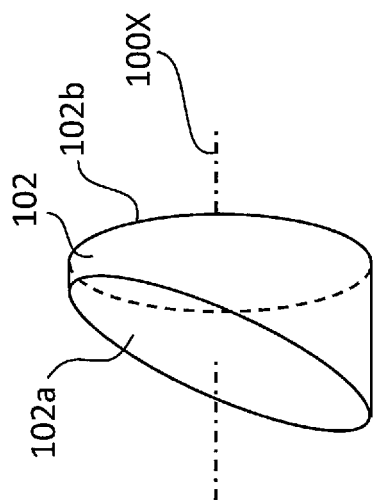

FIGS. 5A and 5B are views for explaining a configuration example of the rotating prism 100. FIG. 5A illustrates a perspective view of the first prism 101 and the second prism 102 integrated in the rotating prism 100. FIG. 5B illustrates a perspective view of only the second prism 102 of the rotating prism 100 of FIG. 5A.

As illustrated in FIG. 5A, the first prism 101 and the second prism 102 are fixedly disposed opposite to each other so that inclined surfaces 101b and 102a face each other at an interval in a substantially parallel state, to thereby configure an integral rotating prism 100. The integral rotating prism 100 has, for example, a cylindrical shape, and is disposed so that the central axis of the cylinder coincides with the optical axis 100X, that is, overlaps with the optical axis center of the light from the plurality of LDs 201B. The rotating prism 100 is configured to be rotationally driven, for example, by the driver 110 (FIG. 1) about this optical axis 100X.

FIGS. 6A and 6B illustrate cross sections at different rotational angles in cross sections parallel to the optical axis 100X. Each of the first prism 101 and the second prism 102 is a wedge prism having wedge-shape in which one of the cross sections parallel to the optical axis 100X is inclined. In this embodiment, the glass material used as the first prism 101 and the glass material used as the second prism 102 are the same. FIGS. 6A and 6B correspond to the states of the rotating prism 100 whose rotation timings are different. As illustrated in FIGS. 6A and 6B, the rotation of the rotating prism 100 changes the angle of the cross section of the prism.

In FIG. 6A, when color light incident on the rotating prism 100 is incident on the first prism 101, the traveling direction of the color light is perpendicular to a first incident surface of the first prism 101. Therefore, when the color light is incident on the first prism 101, no refraction occurs and the traveling direction of the light beam does not change. Thereafter, when the color light travels from the first prism 101 to an air layer 103, in the example of FIG. 6A, a first exit surface 101b of the first prism 101 is inclined with respect to the optical axis. Therefore, according to the inclination angle of the first exit surface 101b and the refractive index of the first prism 101, the light beam of the color light is refracted and is changed in traveling direction.

Thereafter, also when the color light is incident from the air layer 103 to a second incident surface 102a of the second prism 102, similarly, refraction occurs again according to the inclination angle and the refractive index of the second prism 102. At this time, the glass materials of the first prism 101 and the second prism 102 are the same, and the first exit surface 101b of the first prism 101 and the second incident surface 102a of the second prism 102 are substantially parallel. Therefore, the color light incident on the second incident surface 102a of the second prism 102 has the same traveling direction as the light beam direction in the first prism 101, that is, the same traveling direction as that before the color light is incident on the first prism 101.

After that, the color light reaches a second exit surface 102b of the second prism 102. At this time, the light beam direction of the color light is perpendicular to the second exit surface 102b of the second prism 102. Therefore, no refraction occurs even on the surface 102b. As a result, the light beam in the same light beam direction of that of the color light incident on the rotating prism 100 is caused to exit from the rotating prism 100. When the light beam incident on the rotating prism 100 is parallel light, the light beam caused to exit from the rotating prism also becomes parallel light, and then the light beam can be condensed at one point by the condenser lens 210.

In FIG. 6B, when the color light is incident on the first prism 101, since the traveling direction of the color light is perpendicular to the first incident surface 101a of the first prism 101, the color light is not refracted when incident on the first prism 101, and the traveling direction of the light beam does not change. Thereafter, when the color light travels from the first exit surface 101b of the first prism 101 to the air layer 103, the first exit surface 101b is perpendicular to the optical axis 100X on the cross section illustrated in FIG. 6B. On the cross section, although the traveling direction changes in the normal direction (depth direction) of the cross section due to the refraction, the positional change in the traveling direction in the vertical direction does not occur as illustrated in the figure. Thereafter, the light beam is incident on the second incident surface 102a of the second prism 102 from the air layer 103. Also in this case, although the traveling direction changes in the normal direction of the cross section due to the refraction on the cross section similarly, the change in the traveling direction in the vertical direction does not occur as illustrated in the figure.

Thereafter, also when the light beam of the color light reaches the second exit surface 102b of the second prism 102, no refraction occurs because the light beam direction of the color light and the surface 102b are perpendicular to each other. As a result, the light beam having the same light beam direction as that of the color light incident on the rotating prism 100 is caused to exit from the rotating prism 100. Therefore, also in this case, when parallel light is incident, the light beam exited from the rotating prism 100 becomes parallel light. Then, the light beam is condensed at one point by the condenser lens 210.

FIG. 6C illustrates an enlarged view which expands only a part of the cross section of FIG. 6A. FIG. 6D illustrates an enlarged view which expands only a part of the cross section of FIG. 6B. In FIG. 6C, the color light refracted by the air layer 103 travels through the air layer 103 with its light beam inclined from the optical axis 100X. On the other hand, in FIG. 6D, the light beam is not refracted in the air layer 103, and the light beam travels in parallel with the optical axis 100X. In FIG. 6C and FIG. 6D, the traveling directions of the light beams in the first prism 101 and the second prism 102 are the same, and the sum of the prism thicknesses is also substantially the same. From this, when the color light passes through the rotating prism 100, the light beam angle does not change. However, the light beams pass through the air layer 103, while causing the difference in optical path length temporally, to exit from the rotating prism 100.

Although there are only two types of states of the rotating prism 100 illustrated in FIGS. 6A to 6D, actually, by rotating the rotating prism 100, the light beam angle at the air layer 103 changes continuously. As a result, the light beams that differ in optical path length temporally are caused to exit from the rotating prism 100. This time difference changes along with the rotational speed of the rotating prism 100.

In the example of FIG. 1, among the color light exited from the dichroic mirror 206 to the rotating prism 100, the color light in the green region and the red region emitted from the phosphor layer 252 is natural light with random phases. This light is caused to exit as natural light with random phases even after passing through the rotating prism 100. On the other hand, the color light in the blue region is direct light from the plurality of LDs 201B, and is output as strong coherent light with aligned phases. According to the rotating prism 100, the blue light after passing is output as the light beams that differ in optical path length temporally. As a result, it is caused to exit from the rotating prism 100 including light beam components having temporally different phases.

The light passed through the rotating prism 100 is incident on the condenser lens 210, reaches the rod integrator 260 via the color separation wheel 270, and exits from the light source device 20. According to the rotating prism 100, the light that exits from the light source device 20 contains light beam components having temporally different phases, and speckle noise caused by the phase alignment between the light beams can be reduced.

1-2-1. Influence by Rotation Unevenness

When the rotating prism 100 as described above is to be rotated, it is assumed that the case where the rotating prism 100 is entirely inclined with respect to the optical axis 100X may occur due to arrangement of the motor or hysteresis of the mechanism in the driver 110. According to the light source device 20 of this embodiment, speckle noise can be efficiently reduced by suppressing the influence of such rotation unevenness. This matter is described with reference to FIGS. 7A and 7B.

FIGS. 7A and 7B are light beam diagrams for explaining the case when the rotating prism 100 is inclined with respect to the optical axis 100X in the projection display apparatus 1 according to the first embodiment. FIG. 7A illustrates a state in which the rotating prism 100 is parallel to the optical axis 100X. In this state, as described above, the light beam direction when the light beam is incident on the rotating prism 100 and the light beam direction when the light beam exits are the same. When the light beam incident on the rotating prism 100 is parallel light, the light beam caused to exit from the rotating prism also becomes parallel light, and then the light beam is condensed at one point by the condenser lens 210.

FIG. 7B illustrates the case where the rotating prism 100 is inclined with respect to the optical axis. In this case, as illustrated in FIG. 7B, when the color light is incident on the first prism 101, the first incident surface 101a of the first prism 101 is inclined with respect to the traveling direction of the color light. Therefore, according to the inclination angle when the light beam is incident on the first prism 101 and the refractive index of the first prism 101, the light beam is refracted and is changed in traveling direction. Thereafter, when the color light travels from the first exit surface 101b of the first prism 101 to the air layer 103, the light beam is refracted according to the inclination angle at which the exit surface 101b is similarly inclined with respect to the optical axis 100X and the refractive index of the first prism 101, so that the traveling direction is further changed.

Thereafter, also when the color light is incident from the air layer 103 to the second incident surface 102a of the second prism 102, similarly, refraction occurs again according to the inclination angle and the refractive index of the second prism 102. Here, the glass materials of the first prism 101 and the second prism 102 are the same, and the first exit surface 101b of the first prism 101 and the second incident surface 102a of the second prism 102 are substantially parallel. Therefore, the color light incident on the second incident surface 102a of the second prism 102 has the same traveling direction as the light beam direction in the first prism 101.

After that, the color light reaches the second exit surface 102b of the second prism 102. Also in this case, the light beam direction of the color light and the second exit surface 102b of the second prism 102 are inclined, but the second exit surface 102b of the second prism 102 and the first incident surface 101a of the first prism 101 are parallel to each other. Therefore, since the inclination angle of the traveling direction of the color light and the second exit surface 102b of the second prism 102 is the same as the inclination angle of a first incident surface 101a of the first prism 101, the light refracted by this surface 102b travels in the same travelling direction as that of the light beam incident on the first prism 101 as a result.

From the above, when the light beam incident on the rotating prism 100 is parallel light, regardless of the inclination of the entire rotating prism 100 with respect to the optical axis 100X, the light beam caused to exit from the rotating prism 100 also becomes parallel light as a result. The light beam is condensed at one point by the subsequent condenser lens 210. Therefore, even when the rotating prism 100 is entirely inclined with respect to the optical axis 100X due to arrangement of the motor or hysteresis of the mechanism, the light beam can be condensed at one point by the condenser lens 210, so that the decrease in the efficiency of the light source device does not particularly occur. Thus, according to the light source device 20 of this embodiment, speckle noise can be efficiently reduced.

1-3. Effects, Etc.

As described above, in this embodiment, the light source device 20 includes the LDs 201B which are an example of a light source, the optical systems 210 and 260, the first prism 101, the second prism 102, and the driver 110. The LDs 201B emit laser light. The optical systems 210 and 260 have the optical axis 100X for guiding laser light. The first prism 101 is disposed between the LDs 201B and the optical systems 210 and 260, and includes the first incident surface 101a on which laser light is incident, and the first exit surface 101b inclined with respect to the first incident surface 101a. The second prism 102 is disposed between the first prism 101 and the optical systems 210 and 260, and includes the second incident surface 102a which faces the first exit surface 101b at an interval, and the second exit surface 102b inclined with respect to the second incident surface 102a. The driver 110 rotates the first and second prisms 101 and 102 around the optical axis 100X in a state where the first exit surface 101b and the second incident surface 102a are inclined with respect to the optical axis 100X.

According to the light source device 20 described above, with the simple configuration in which the first and second prisms 101 and 102 rotate in the state in which the adjacent surfaces 101b and 102a are inclined with respect to the optical axis 100X, speckle noise in the light from the LDs 201B can be easily reduced.

In this embodiment, the first and second prisms 101 and 102 are disposed so that the first incident surface 101a and the second exit surface 102b are orthogonal to the optical axis 100X. According to this, speckle noise can be reduced without significantly shifting the optical path of the laser light before and after the laser light passes through the first and second prisms 101 and 102. Therefore, downsizing and simplification of the device configuration can be easily realized.

In this embodiment, the optical systems 210 and 260 include the condenser lens 210 (example of the condensing optical system) disposed to condense the laser light incident from the second prism 102. According to the light source device 20 of this embodiment, the decrease in the efficiency of condensing by the condenser lens 210 is suppressed, so that speckle noise can be efficiently reduced.

In this embodiment, the optical systems 210 and 260 further include the rod integrator 260 (example of the integrator optical system) disposed to diffuse the laser light condensed by the condenser lens 210. According to the light source device 20 of this embodiment, the decrease in the efficiency of generating the diffused light by the rod integrator 260 is suppressed, so that the speckle noise can be efficiently reduced.

In this embodiment, the first and second prisms 101 and 102 are rotated with the optical axis 100X being the rotation center. According to this, the device configuration can be easily reduced in size.

In this embodiment, the light source of the light source device 20 includes the plurality of LDs 201B. The light source device 20 further includes the incident optical systems 209 and 208 which collimate the laser light emitted from the plurality of LDs 201B and cause the laser light incident on the first incident surface 101a of the first prism 101. According to this, the decrease in the light output by the laser light from the plurality of LDs 201B is suppressed, so that speckle noise can be efficiently reduced.

In this embodiment, the projection display apparatus 1 includes the light source device 20 and the DMD 150 which is an example of the image generator. The DMD 150 generates image light based on the light from the light source device 20. In the light source device 20 of the projection display apparatus 1, speckle noise can be reduced only by incorporating the first and second prisms 101 and 102 so as to be rotatable without largely changing the device configuration of the existing projection display apparatus. Further, the decrease in the light output in the projection display apparatus 1 is also suppressed, so that speckle noise can be efficiently reduced.

As a matter of course, the content of the present disclosure is not limited to the specific examples described in the above embodiment, and for example, the following modifications can be considered.

Second Embodiment

A second embodiment is described below with reference to FIG. 8 to FIG. 10. In the first embodiment, speckle noise in the monochromatic laser light source is reduced. In the second embodiment, a projection display apparatus capable of reducing speckle noise in laser light sources of a plurality of colors is described.

Hereinafter, descriptions of the configuration and operation similar to those of the projection display apparatus 1 and the light source device 20 according to the first embodiment are omitted as appropriate, and the projection display apparatus and a light source device 21 according to this embodiment is described.

2-1. Configuration and Operation, Etc.

Figure 8:
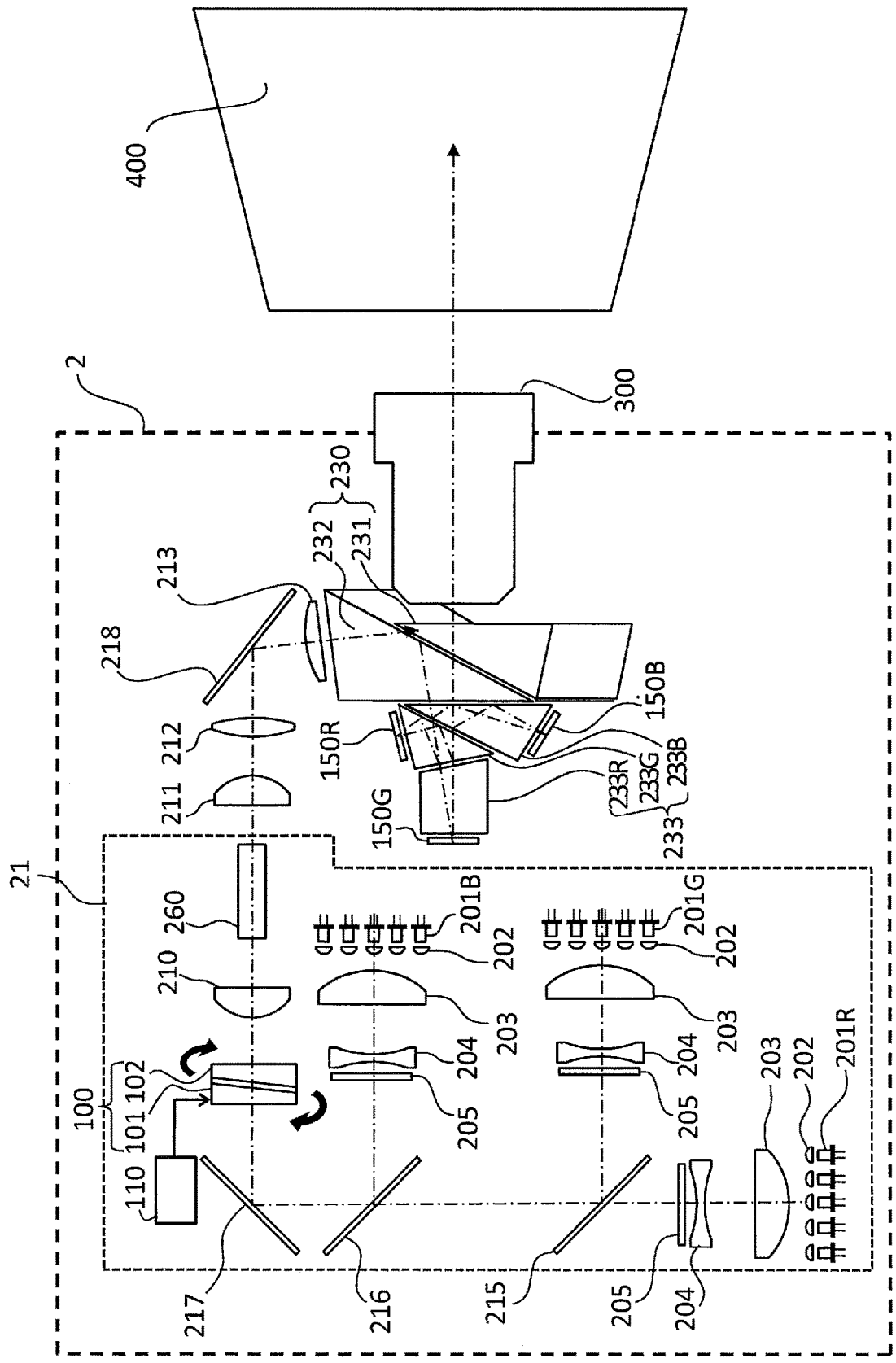
FIG. 8 is a diagram illustrating a configuration of a projection display apparatus according to a second embodiment.

FIG. 8 is a diagram illustrating a configuration of a projection display apparatus 2 according to the second embodiment. In the projection display apparatus 1 (FIG. 1) of the first embodiment, the number of DMD 150 is one, and the light source device 20 performs color synthesis in a time division manner using the LDs 201B and the phosphor wheel 250 to generate white light. The projection display apparatus 2 of this embodiment includes the light source device 21 which uses semiconductor lasers 201R, 201G, and 201B as light sources for, for example, color light of three primary colors, and performs color synthesis without time division using a plurality of DMDs 150R, 150G, and 150B to generate white light.

In the projection display apparatus 2 of this embodiment, the DMDs 150R, 150G, and 150B are driven by a light deflection control unit (not shown) correspondingly to the red region, the green region, and the blue region of the three primary colors, respectively. Further, in a configuration example of FIG. 8, the projection display apparatus 2 does not particularly use the phosphor wheel 250 and the color separation wheel 270 as in FIG. 1.

The light source device 21 illustrated in FIG. 8 includes a plurality of lenses 202, 203, and 204 and diffusion plates 205 for the LDs 201B for blue region display, LDs 201G for green region display, and LDs 201R for red region display. For example, the lens 202 collimates the light that exits from each of the LDs 201B, the LDs 201G, and the LDs 201R. Furthermore, the light source device 21 includes a green-region reflection dichroic mirror 215 and a blue-region reflection dichroic mirror 216.

The LDs 201B for blue region display emit, for example, color light in the blue region in a wavelength range of 447 nm to 462 nm. The LDs 201G for green region display emit, for example, color light in the green region in a wavelength range of 517 nm to 533 nm. The LDs 201R for red region display emit, for example, color light in the red region in a wavelength range of 633 nm to 449 nm.

The light emitted by the LDs 201R and LDs 201G each passes through the lenses 202, 203, and 204 and the diffusion plate 205, and reaches the green-region reflection dichroic mirror 215. The green region reflecting dichroic mirror 215 is designed to reflect the color light in the green region. The light from the LDs 201R and LDs 201G is transmitted or reflected by the dichroic mirror 215, and travels in the direction of the blue-region reflection dichroic mirror 216.

Similarly, the light emitted by the LDs 201B passes through the lenses 202, 203, and 204 and the diffusion plate 205, and reaches the blue-range reflection dichroic mirror 216. The blue region reflecting dichroic mirror 216 is designed to reflect the color light in the blue region. The color light from the green-region reflection dichroic mirror 215 and the light emitted by the LDs 201B are transmitted or reflected by the dichroic mirror 216, are reflected by the reflection mirror 217, and are incident on the rotating prism 100.

Unlike the first embodiment, the color light in the blue region, the green region, and the red region in this embodiment is direct light from the plurality of LDs 201B, 201G, and 201R, and is output as strong coherent light with aligned phases. Therefore, in the light source device 21 of this embodiment, as illustrated in FIG. 8, the rotating prism 100 is disposed on the optical path through which the color light of the respective colors passes as described above. Therefore, by the action of the rotating prism 100 described above, after passing through the rotating prism 100, the light beams that differ in optical path length temporally are output, and as a result, they are caused to exit from the rotating prism 100 as light beam components that differ in phase temporally. The light that transmitted through the rotating prism 100 is incident on the condenser lens 210 and condensed on the rod integrator 260.

Figure 9:
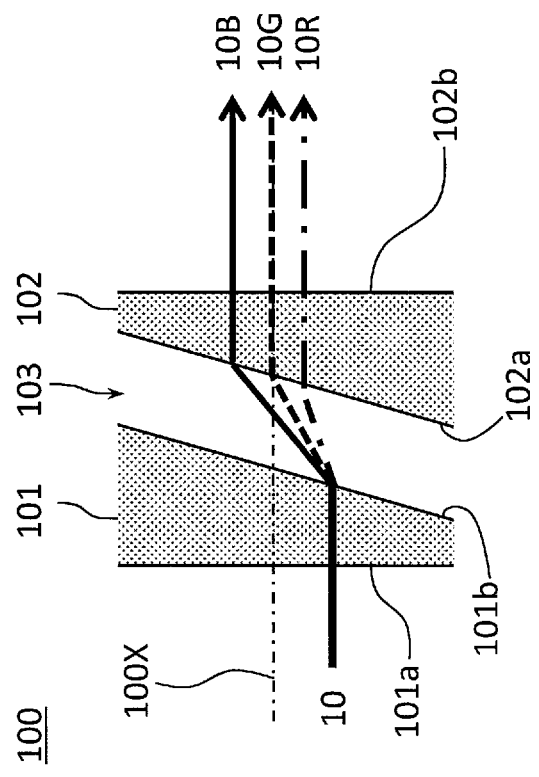
FIG. 9 is a view illustrating a cross section of a rotating prism according to the second embodiment.

FIG. 9 illustrates a cross-sectional view taken along light beams when a plurality of kinds of color light are incident on the rotating prism 100. In FIG. 9, when a plurality of kinds of color light 10 are incident on the first prism 101, the traveling direction of the color light 10 is perpendicular to the first incident surface 101a of the first prism 101. Therefore, when the color light 10 is incident on the first prism 101, the color light 10 is not refracted and the traveling direction of the light beams does not change.

Thereafter, when the color light 10 travels from the first exit surface 101b of the first prism 101 to the air layer 103, the first exit surface 101b is inclined with respect to the optical axis 100X, and light beams are refracted according to the inclination angle and the refractive index of the first prism 101. Here, the refractive index of a general prism differs depending on a wavelength of color light, and the refractive index increases in the order of the red region, the green region, and the blue region. From this, the traveling direction changes for each kind of color light 10R, 10G, and 10B of the color regions. Specifically, the color light 10R in the red region with a low refractive index has a small change in the traveling direction, and the change in the traveling direction becomes larger toward the color light 10B in the blue region.

Thereafter, when the color light is incident from the air layer 103 on the second incident surface 102a of the second prism 102, refraction occurs again according to the inclination angle and the refractive index of the second prism similarly. At this time, as in the first embodiment, the glass materials of the first and second prisms 101 and 102 are the same, and the first exit surface 101b and the second incident surface 102a are substantially parallel. Thus, the color light 10R, 10G, and 10B of the plurality of kinds of color incident on the second incident surface 102a of the second prism 102 has the same traveling direction as the light beam direction in the first prism 101. That is, the color light 10R, 10G, and 10B in the red region, the green region, and the blue region has the same direction as the traveling direction before the color light 10R, 10G, and 10B is incident on the first prism 101. However, since the traveling directions of the color light 10R, 10G, and 10B when the color light 10R, 10G, and 10B travels from the first exit surface 101b of the first prism 101 to the air layer 103 are different, the light beam positions when the color light 10R, 10G, and 10B is incident from the air layer 103 on the second incident surface 102a of the second prism 102 may be different.

Thereafter, the color light 10R, 10G, and 10B reaches the second exit surface 102b of the second prism 102. The second exit surface is perpendicular to the light beam directions of the color light 10R, 10G, and 10B, and therefore, no refraction occurs on the surface 102b. As a result, the color light 10B in the blue region, the color light 10G in the green region, and the color light 10R in the red region which have the same direction as the light beam direction of the color light 10 incident on the rotating prism 100 while having different light beam positions are caused to exit from the rotating prism 100. Therefore, by making each color light 10R, 10G, and 10B incident on the rotating prism 100 into parallel light, the light beams caused to exit from the rotating prism 100 also become parallel light. After that, the light beams of the colors can be condensed on the rod integrator 260 by the condenser lens 210.

The light exited from the rod integrator 260 is transmitted through the lenses 211 and 212, is bent in direction by the reflection mirror 218, is transmitted through the lens 213, and is incident on the TIR prism 230. The projection display apparatus 2 of this embodiment further includes a color prism 233. The light entering the TIR prism 232 from the lens 213 is totally reflected by the air layer in the TIR prism 232 and is incident on the color prism 233.

The color prism 233 includes three prisms 233G, 233R, and 233B. A blue reflecting dichroic mirror (not shown) and a red reflecting dichroic mirror (not shown) are formed on the near planes. The dichroic mirrors only directs a light beam in the blue region into the color prism 233B, only directs a light beam in the red region into the color prism 233R, and only directs a light beam in the green region into the color prism 233G. Thus, the color prism 233 allows these light beams having each color to substantially form images on the corresponding DMDs 150B, 150R, and 150G.

The laser light in the blue region, the green region, and the red region caused to exit to the projection surface 400 contains many components having different phases due to the rotating prism 100 and the rod integrator 260. Therefore, in the color light scattered from the projection surface 400, the components that generate speckle noise due to interference are reduced, and thus speckle noise can be effectively suppressed. In addition, since the light beam angles of the light beams passed through the rotating prism 100 do not change depending on the color light in the blue region, the green region, and the red region as described above, the light can be condensed by the condenser lens 210 without light loss. As a result, in the projection display apparatus 2, it is possible to suppress the decrease in light output while reducing speckle noise for a plurality of colors.

2-2. Influence by Rotation Unevenness

According to the light source device 21 of this embodiment, speckle noise for a plurality of colors can be efficiently reduced while suppressing the influence of rotational unevenness. This matter is described with reference to FIG. 10.

Figure 10:
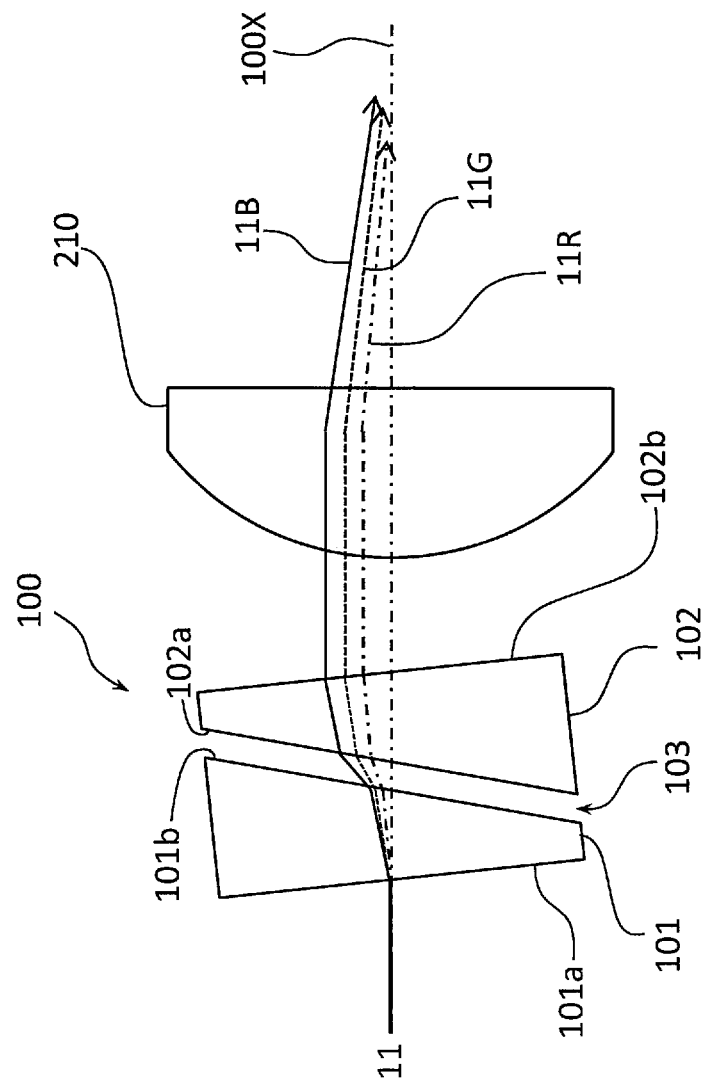
FIG. 10 is a light beam diagram when the rotating prism according to the second embodiment is inclined.

FIG. 10 illustrates the case where the rotating prism 100 is inclined with respect to the optical axis 100X in the projection display apparatus 2 of this embodiment. In this case, when color light 11 including the blue region, the green region, and the red region is incident on the first prism 101, similarly to FIG. 7B, light beams are refracted according to the inclination angle of the first incident surface 101a of the first prism 101 with respect to the traveling direction of the color light and the refractive index of the first prism 101. At this time, the traveling direction changes according to the refractive index of each color light.

Thereafter, also when the color light travels from the first exit surface 101b of the first prism 101 to the air layer 103, the light beams are refracted according to the inclination angle of the first exit surface 101b and the refractive index of the first prism 101, and the traveling directions of the color light are further changed. Thereafter, also when the color light is incident from the air layer 103 to the second incident surface 102a of the second prism 102, similarly, refraction occurs again according to the inclination angle and the refractive index of the second prism 102. At this time, according to the glass material of the first and second prisms 101 and 102, and facing the surface 101b and the surface 102a each other substantially in parallel, color light 11R, 11G, and 11B incident on the second incident surface 102a of the second prism 102 has the same traveling direction as the light beam direction in the first prism 101.

Thereafter, the color light 11R, 11G, and 11B reaches the second exit surface 102b of the second prism 102. The second exit surface 102b of the second prism 102 is inclined with respect to the light beam directions of the color light 11R, 11G, and 11B. However, with respect to the traveling direction of the color light, the inclination angle of the second exit surface 102b of the second prism 102 is equal to the inclination angle of the first incident surface 101a of the first prism 101. Therefore, the color light 11R, 11G, and 11B refracted by the second exit surface 102b have the same traveling direction as the light beam of the color light 11 incident on the first prism 101 as a result.

Therefore, when the color light 11 incident on the rotating prism 100 is parallel light, the light beams exited from the rotating prism 100 including the blue region light 11B, the green region light 11G, and the red region light 11R all become parallel light. Then, the light beams are condensed at one point by the condenser lens 210. Therefore, according to the light source device 21 of this embodiment, even when the rotating prism 100 is entirely inclined with respect to the optical axis 100X, the light beams including the laser light in the blue region, the green region, and the red region can be condensed at one point by the condenser lens 210, so that the decrease in efficiency and the like can be avoided.

2-3. Effects, Etc.

As described above, in this embodiment, the plurality of semiconductor lasers that are light sources of the light source device 21 include the LDs 201R, 201G, and 201B of a plurality of colors. According to the light source device 21 of this embodiment, speckle noise for a plurality of colors can be easily reduced.

According to the light source device 21 of this embodiment, also when the laser light sources of a plurality of colors are used in the projection display apparatus 2, the incident angle for each color to the rod integrator 260 does not change. Thus, it is also possible to obtain stable light output even when rotation unevenness of the rotating prism 100 or the like occurs.

Other Embodiments

As described above, the embodiments have been described as an example of the technology disclosed in the present application. However, the technology in the present disclosure is not limited to this, and is applicable to embodiments in which changes, replacements, additions, omissions, and the like are appropriately made. Further, each component described in the embodiment can be combined to make a new embodiment. Therefore, other embodiments are described below.

In the first and second embodiments above, the first prism 101 and the second prism 102 are disposed at an interval, and the air layer 103 is provided. In this embodiment, an optical material having a refractive index different from that of the first and second prisms 101 and 102 may be filled in the interval between the first exit surface 101b and the second incident surface 102a. Even in this case, if there is a difference in refractive index between the first and second prisms and the optical material, the same effect as in each embodiment can be obtained. For example, a glass plate or a liquid having a refractive index different from that of the first prism 101 and the second prism 102 may be filled in the above-mentioned interval. With this, it is possible to simplify the assembly.

In the second embodiment described above, the configuration example of the projection display apparatus 2 using the semiconductor lasers for all of the blue region, the green region, and the red region has been described (FIG. 8). In this embodiment, as described in the first embodiment, the projection display apparatus 2 may use the LDs 201B for the blue region, and may use phosphor light emission for the green region and the red region. With this, it becomes possible to achieve simplification or cost reduction of the light source or the cooling mechanism.

In each of the embodiments described above, the DMDs 150, 150R, 150G, and 150B are described as an example of the image generator in each of the projection display apparatuses 1 and 2. In this embodiment, the image generator is not limited to the DMDs, but may be, for example, various spatial light modulation elements such as liquid crystal elements.

In each of the embodiments described above, the example in which the light source device 20 or 21 is used for the projection display apparatus 1 or 2 has been described. In this embodiment, the light source device 20 or 21 is not limited to the projection display apparatus 1 or 2 but can be applied to various technologies using a laser light source, and may be used for various illumination systems, for example.

As described above, the embodiments have been described as an example of the technology in the present disclosure. To that end, the accompanying drawings and detailed description are provided.

Accordingly, some of the components described in the accompanying drawings and the detailed description may include not only essential components for solving the problem but also components which are not essential for solving the problem in order to describe the technologies described above. Therefore, the fact that those non-essential components are described in the attached drawings and the detailed description should not immediately mean that those non-essential components are essential.

Further, the above-described embodiments are provided to describe the technology in the present disclosure, and hence it is possible to make various changes, replacements, additions, omissions, and the like within the scope of claims or the equivalent thereof.

The present disclosure can realize, for example, in a projection display apparatus, a light source device and a projection display apparatus capable of reducing speckle noise with little decrease in light output without largely changing the existing device configuration.

The invention claimed is:

1. A light source device comprising:
   a light source configured to emit laser light;
   an optical system having an optical axis for guiding the laser light;
   a first prism which is disposed between the light source and the optical system and includes a first incident surface on which the laser light is incident, and a first exit surface inclined with respect to the first incident surface;
   a second prism which is disposed between the first prism and the optical system and includes a second incident surface facing the first exit surface at an interval, and a second exit surface inclined with respect to the second incident surface; and a driver configured to rotate the first and second prisms around the optical axis continuously in a state in which the first exit surface and the second incident surface are inclined with respect to the optical axis so that an optical path length between the first exit surface and the second incident surface is changed periodically, wherein the optical system includes a condensing optical system disposed to condense laser light incident from the second prism, wherein the optical system further includes an integrator optical system disposed to diffuse the laser light condensed by the condensing optical system.

2. The light source device according to claim 1, wherein the first and second prisms are disposed so that the first incident surface and the second exit surface are orthogonal to the optical axis.

3. The light source device according to claim 1, wherein the driver rotates the first and second prisms with the optical axis being a rotation center.

4. The light source device according to claim 1,
wherein the light source includes a plurality of semiconductor lasers, and
wherein the light source device further includes an incident optical system which collimates laser light emitted from the light source to enter the first incident surface of the first prism.

5. The light source device according to claim 4, wherein the plurality of semiconductor lasers include semiconductor lasers for a plurality of colors.

6. The light source device according to claim 1, wherein an optical material is filled in an interval between the first exit surface and the second incident surface, the optical material having a refractive index different from a refractive index of the first and second prisms.

7. A projection display apparatus comprising:
a light source device; and
an image generator configured to generate image light based on light from the light source device, wherein the light source device comprises:
a light source configured to emit laser light;
an optical system having an optical axis for guiding the laser light;
a first prism which is disposed between the light source and the optical system and includes a first incident surface on which the laser light is incident, and a first exit surface inclined with respect to the first incident surface;

a second prism which is disposed between the first prism and the optical system and includes a second incident surface facing the first exit surface at an interval, and a second exit surface inclined with respect to the second incident surface; and a driver configured to rotate the first and second prisms around the optical axis continuously in a state in which the first exit surface and the second incident surface are inclined with respect to the optical axis so that an optical path length between the first exit surface and the second incident surface is changed periodically.

8. The light source device according to claim 1, comprising a color separation wheel which separates an incident light transmitting the first prism and the second prism into color beams in a time division.

9. The projection display apparatus according to claim 7, wherein the first and second prisms are disposed so that the first incident surface and the second exit surface are orthogonal to the optical axis.

10. The projection display apparatus according to claim 7, wherein the optical system includes a condensing optical system disposed to condense laser light incident from the second prism.

11. The projection display apparatus according to claim 10, wherein the optical system further includes an integrator optical system disposed to diffuse the laser light condensed by the condensing optical system.

12. The projection display apparatus according to claim 7, wherein the driver rotates the first and second prisms with the optical axis being a rotation center.

13. The projection display apparatus according to claim 7, wherein the light source includes a plurality of semiconductor lasers, and wherein the light source device further includes an incident optical system which collimates laser light emitted from the light source to enter the first incident surface of the first prism.

14. The projection display apparatus according to claim 13, wherein the plurality of semiconductor lasers include semiconductor lasers for a plurality of colors.

15. The projection display apparatus according to claim 7, wherein an optical material is filled in an interval between the first exit surface and the second incident surface, the optical material having a refractive index different from a refractive index of the first and second prisms.

16. The projection display apparatus according to claim 7, comprising a color separation wheel which separates an incident light transmitting the first prism and the second prism into color beams in a time division.

\* \* \* \* \*